W. N. McLAGAN.
TRAP NEST.
APPLICATION FILED APR. 15, 1922.

1,430,457.

Patented Sept. 26, 1922.
3 SHEETS—SHEET 1.

William N. McLagan, INVENTOR

BY Victor J. Evans, ATTORNEY

L. B. Middleton, WITNESS

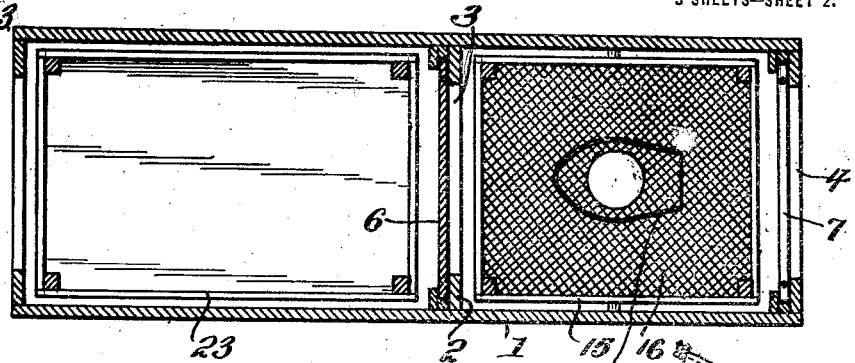
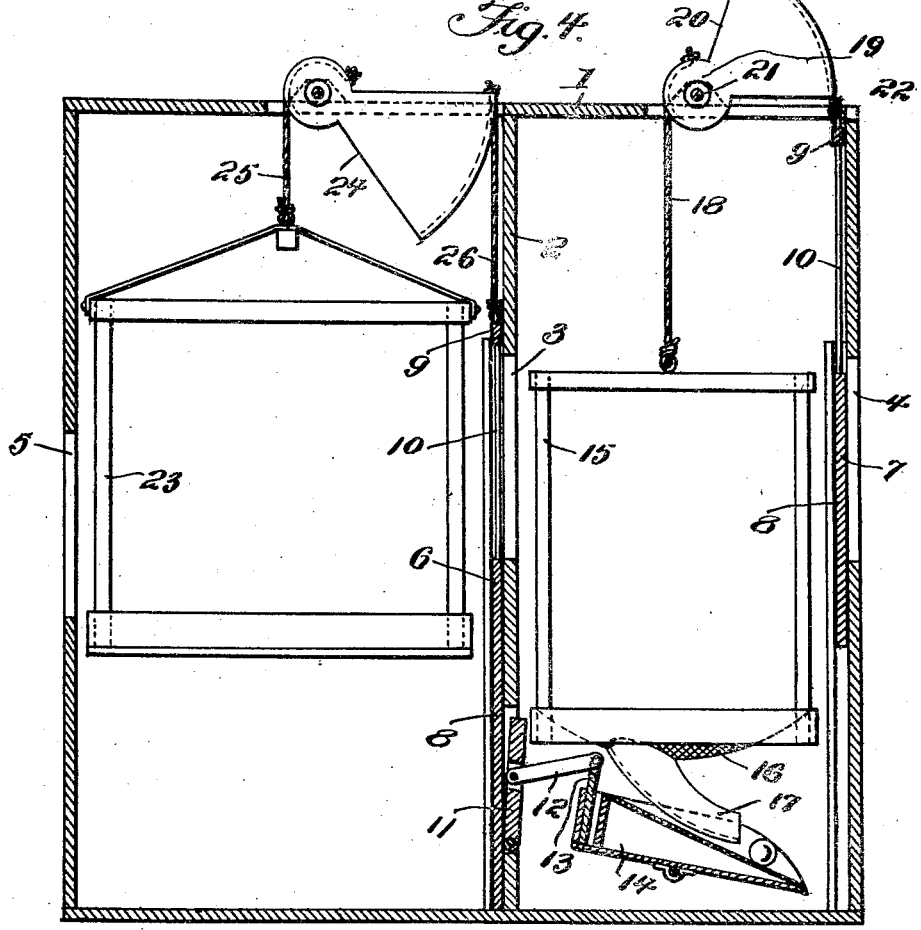

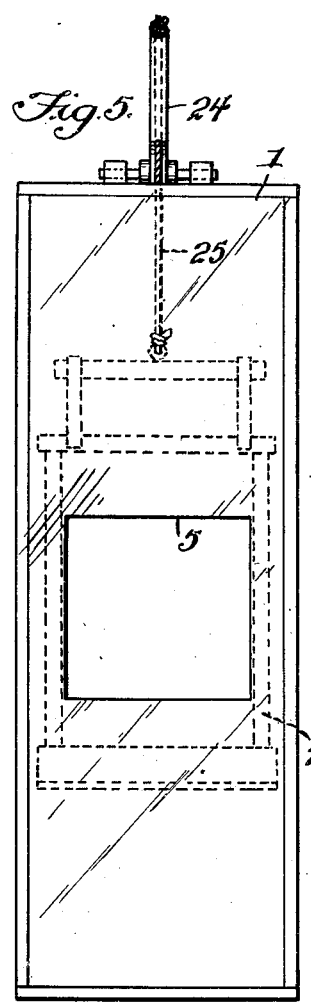
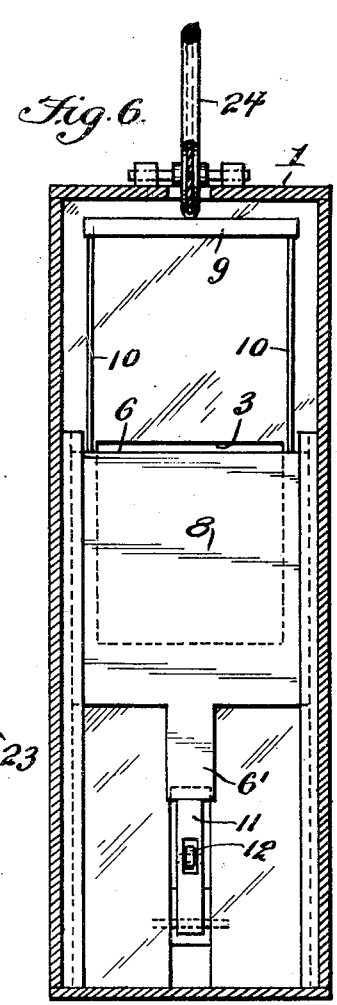
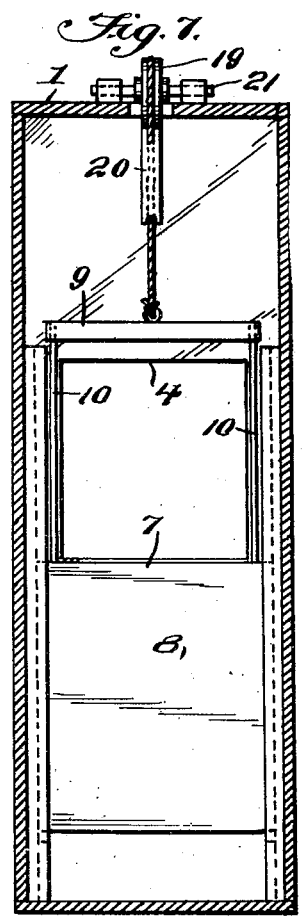
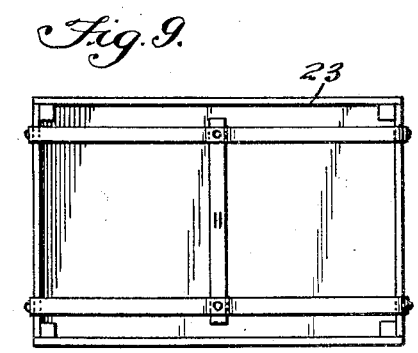
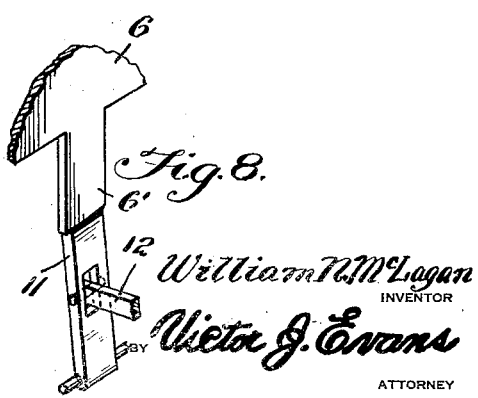

Patented Sept. 26, 1922.

1,430,457

UNITED STATES PATENT OFFICE.

WILLIAM N. McLAGAN, OF SYCAMORE, ILLINOIS, ASSIGNOR OF FORTY-NINE PER CENT TO THOMAS J. RONIN AND GUY W. MORGAN, OF SYCAMORE, ILLINOIS.

TRAP NEST.

Application filed April 15, 1922. Serial No. 552,992.

*To all whom it may concern:*

Be it known that I, WILLIAM N. MCLAGAN, a citizen of the United States, residing at Sycamore, in the county of Dekalb and State of Illinois, have invented new and useful Improvements in Trap Nests, of which the following is a specification.

This invention relates to a trap nest, the general object of the invention being to provide means for causing the hen to enter a second yard after she has laid an egg so that the poultryman can tell which hens have laid the eggs.

Another object of the invention is to provide means whereby the nest will be closed to the first yard when the hen enters said nest and for opening said nest to the first yard when the hen leaves the nest.

Another object of the invention is to provide means for controlling the outlet from the nest by the egg laid by the hen.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
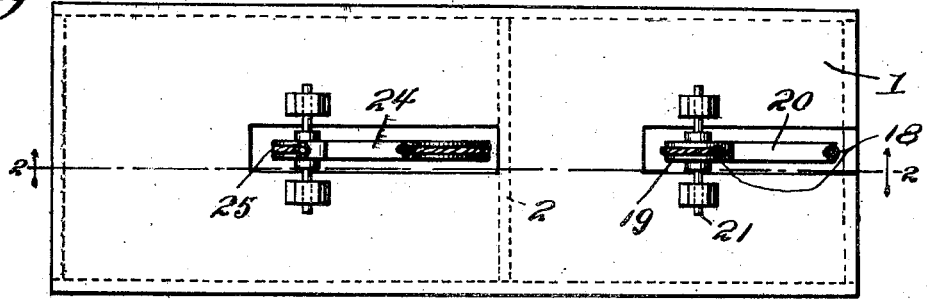
Figure 1 is an elevation of the invention.
Figure 2:
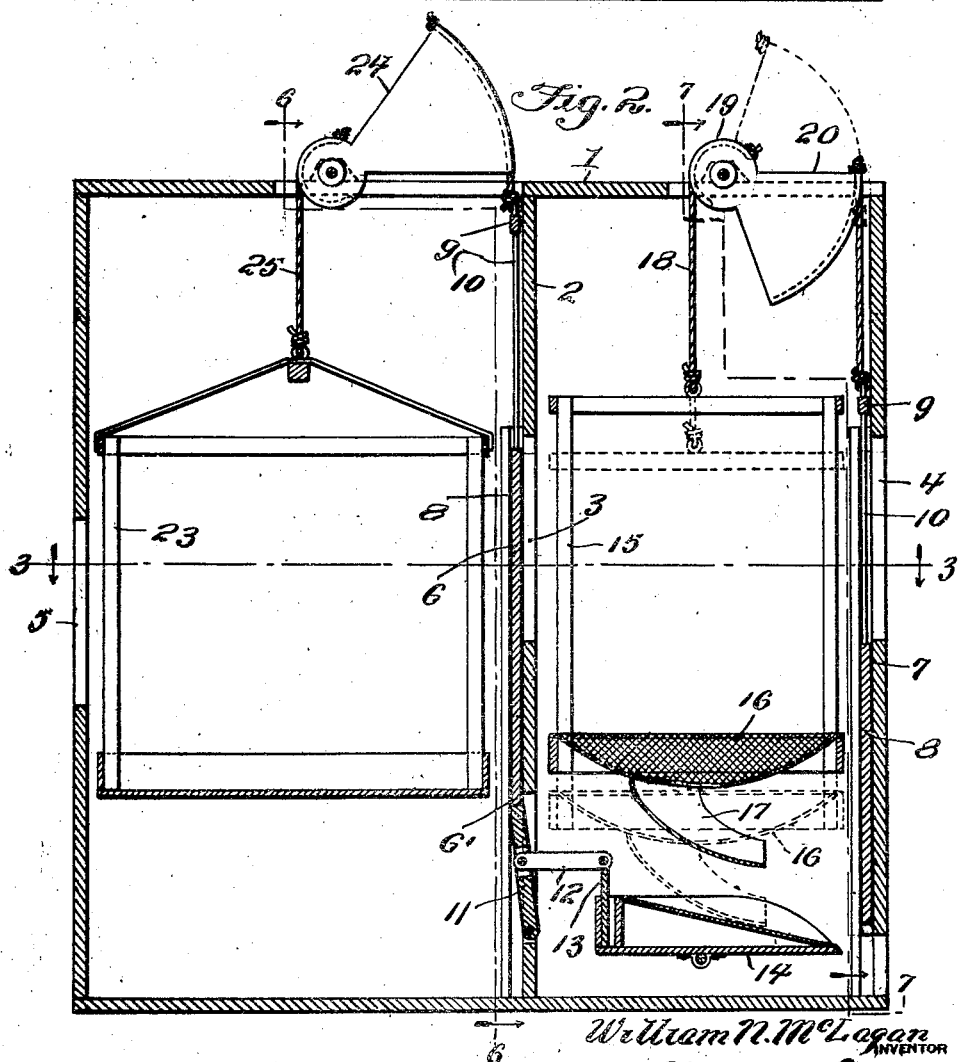
Figure 2 is a longitudinal sectional view.

The remaining figures are detail views.

In these views 1 indicates the nest box which is divided into two compartments by the partition 2. This partition has an opening 3 therein so that the hen can pass from one compartment to the other and the nest compartment has an entrance opening 4 while the second compartment has an outlet opening 5. The opening 3 is controlled by a door 6 and the opening 4 by a door 7. Each door is composed of a plate 8, a cross piece 9 and the wires or rods 10 which connect the cross piece with the plate. The door 6 is provided with a depending part 6′ which is adapted to be engaged by a catch 11 which is pivoted to the partition and which is connected by a rod 12 with an upright 13 on a trip tray 14 which is pivotally supported in the lower part of the nest compartment. When the tray is in normal position the catch 11 will rest under the end of the extension 6′ and thus hold the door in a position closing the opening. The nest is carried by a frame 15 which has a rounded bottom 16 formed of flexible material and from which projects a trough 17, these parts being so arranged that when an egg is deposited in the nest it will roll down the trough and drop into the tray thus causing the tray to tilt and withdraw the catch from under the end of the door so that said door can drop by gravity and thus open communication between the two compartments. The top of the frame 15 is connected by the cable 18 with the rounded part 19 of the segmental shaped door lift 20 which is pivoted to the top of the nest box, as shown at 21. A cable 22 has one end connected with the rounded edge of the lift which is grooved to receive the cable and the other end of the cable is connected with the cross piece of the door 7. This door is made heavier than the nest and its frame so that it will normally hold the nest frame in raised position and it will rest below the opening 4. Thus a hen can enter the nest through the opening 4 but her weight will then overcome the weight of the door so that the frame will be lowered and the door raised to close the opening 4. This will prevent other hens from getting into the nest with the first hen. A frame 23 is located in the second compartment, this frame being connected with a lift 24, which is made similar to the lift 20, by means of the cable 25 and the curved edge of this lift is connected by a cable 26 with the door 6.

From the above it will be seen that when the nest is empty the door 7 will be in its lowest position thus leaving the entrance opening 4 clear. The door 6 will be in raised position, being held in this position by the catch 11. When a hen enters the nest her extra weight will cause the nest frame to lower and thus raise the door closing the opening 4. When she lays her egg it will roll down the trough 17 and drop into the tray 14, tilting said tray and removing the catch 11 from under the door 6. As this door 6 is of greater weight than the frame 23 it will move downwardly by gravity, thus clearing the opening 3 and raising the bottom of the frame 23 opposite said opening. As this opening 3 is the only one clear the hen will pass from the nest through the same and step upon the bottom of the frame 23. Her weight on this frame will cause the same to lower, thus raising the door 6 and the catch 11 will swing under the extension of said door and thus hold the same in closed position. The hen can then leave the nest box by the opening 5. As soon as she leaves the nest frame the door 7 will drop, thus exposing the opening 4 so that the nest is ready to receive another hen. The opening 5 should be made to open out into a yard which is separated from the yard from which the hens enter the nest. In this way the poultryman can tell which hens laid the eggs and which hens failed to lay.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A trap nest of the class described comprising a housing, a partition dividing the same into two compartments, a frame in each compartment, said partition having an opening therein and the housing having an entrance opening leading into the nest compartment and an exit opening leading from the second compartment, a door for closing the entrance opening, a door for closing the opening in the partition, movable frames in said compartments, those in the first compartment being made to support a nest, means for connecting the frames with the doors, said doors being heavier than the frames so that they are normally in open position with the frames in raised position, means for normally holding the door on the partition closed and means for moving such means into inactive position when an egg is deposited in the nest by the hen.

2. A trap nest of the class described comprising a housing, a partition dividing the same into two compartments, a frame in each compartment, said partition having an opening therein and the housing having an entrance opening leading into the nest compartment and an exit opening leading from the second compartment, a door for closing the entrance opening, a door for closing the opening in the partition, movable frames in said compartments, those in the first compartment being made to support a nest, means for connecting the frames with the doors, said doors being heavier than the frames so that they are normally in open position with the frames in raised position, means for normally holding the door on the partition closed, means for moving such means into inactive position when an egg is deposited in the nest by the hen, such means consisting of a pivoted tray, a catch for holding the door in closed position, means for connecting the catch with the tray and a trough connected with the nest for directing the egg into the tray.

3. A trap nest of the class described comprising a housing, a partition dividing the same into two compartments, openings in the housing and partition, a nest frame in one compartment, a platform frame in the second compartment, doors for controlling the entrance opening and the opening in the partition, segmental door lifts pivotally supported in the housing, flexible connections between the lifts and the doors and between the lifts and the frames, said doors being made heavier than the frames so that they will normally be in open position but will close under the weight of the hen in the frames, a tray pivotally supported in the lower part of the nest compartment, a trough for directing the egg from the nest into the tray, a catch for holding the compartment door in raised position and connections from the catch to the tray.

In testimony whereof I affix my signature.

WILLIAM N. McLAGAN.